(12) United States Patent
Sy et al.

(10) Patent No.: US 11,922,042 B2
(45) Date of Patent: Mar. 5, 2024

(54) DATA PLACEMENT IN LARGE SCALE OBJECT STORAGE SYSTEM

(71) Applicant: SCALITY, S.A., Paris (FR)

(72) Inventors: Lam Pham Sy, Issy-les-Moulineaux (FR); Frederic Ferrandis, Saint Leu la Foret (FR); Benoit Artuso, Chanteloupe les Vignes (FR)

(73) Assignee: Scality, S.A., Paris (FR)

( * ) Notice: Subject to any disclaimer, the term of this patent is extended or adjusted under 35 U.S.C. 154(b) by 0 days.

(21) Appl. No.: 17/515,167

(22) Filed: Oct. 29, 2021

(65) Prior Publication Data
US 2023/0139581 A1     May 4, 2023

(51) Int. Cl.
*G06F 3/06*     (2006.01)

(52) U.S. Cl.
CPC .......... *G06F 3/0646* (2013.01); *G06F 3/0619* (2013.01); *G06F 3/0659* (2013.01); *G06F 3/067* (2013.01)

(58) Field of Classification Search
None
See application file for complete search history.

(56) References Cited

U.S. PATENT DOCUMENTS

| | | |
|---|---|---|
| 8,429,444 B2 | 4/2013 | Rancurel et al. |
| 8,447,938 B2 * | 5/2013 | Drews ................ G06F 11/1448 711/E12.001 |
| 9,195,673 B2 | 11/2015 | Constantinescu et al. |
| 9,524,302 B2 | 12/2016 | Regni et al. |

(Continued)

FOREIGN PATENT DOCUMENTS

| | | | |
|---|---|---|---|
| WO | WO-2011074699 A1 * | 6/2011 | .......... G06F 9/5083 |
| WO | 2015134677 A1 | 9/2015 | |
| WO | 2015134680 A1 | 9/2015 | |

OTHER PUBLICATIONS

International Search Report and Written Opinion for PCT Patent Application No. PCT/US22/47928, dated Feb. 23, 2023, 11 pages.

(Continued)

*Primary Examiner* — Brian R Peugh
(74) *Attorney, Agent, or Firm* — Compass IP Law PC

(57) ABSTRACT

A method is described. The method includes performing the following as part of a process for storing an object into an object storage system: assigning chunks of the object to different servers of the object storage system and constructing a graph for the object that describes which of the chunks of the object are being stored in which of the servers; recognizing a stuck condition in which a server with available storage space to store one of the chunks of the object cannot be found; in response to the recognizing, expanding the graph with information from graphs of other objects that are stored in the object storage system to identify other servers in the object storage system to help resolve the stuck condition; processing the expanded graph information to recognize a predefined graphical pattern; applying a predefined solution for the predefined graphical pattern to the expanded graph information to resolve the stuck situation including modifying at least some of the information from the graphs of the other objects; and, moving chunks of one of the other objects affected by the modifying over a network to a new server within the object storage system.

20 Claims, 17 Drawing Sheets

(56) References Cited

U.S. PATENT DOCUMENTS

| | | |
|---|---|---|
| 10,248,682 B2 | 4/2019 | Regni et al. |
| 10,261,960 B2 | 4/2019 | Regni et al. |
| 10,366,070 B2 | 7/2019 | Regni et al. |
| 2014/0279927 A1* | 9/2014 | Constantinescu ... G06F 16/1748 707/679 |
| 2020/0134082 A1 | 4/2020 | Harrington et al. |
| 2021/0174128 A1* | 6/2021 | Charnock ............ G06V 10/774 |
| 2021/0286534 A1 | 9/2021 | Mulholland et al. |
| 2021/0397581 A1 | 12/2021 | Regni et al. |
| 2023/0006814 A1 | 1/2023 | Schuberg et al. |

OTHER PUBLICATIONS

Ripon Patgiri. Taxonomy of Big Data: A Survey. arXiv:1808.08474v3. Nov. 25, 2019. pp. 1-15.

Xiaowei Zhu et al. LiveGraph: A Transactional Graph Storage System with Purely Sequential Adjacency List Scans. arXiv:1910.05773v2. Aug. 29, 2020. pp. 1-20.

\* cited by examiner

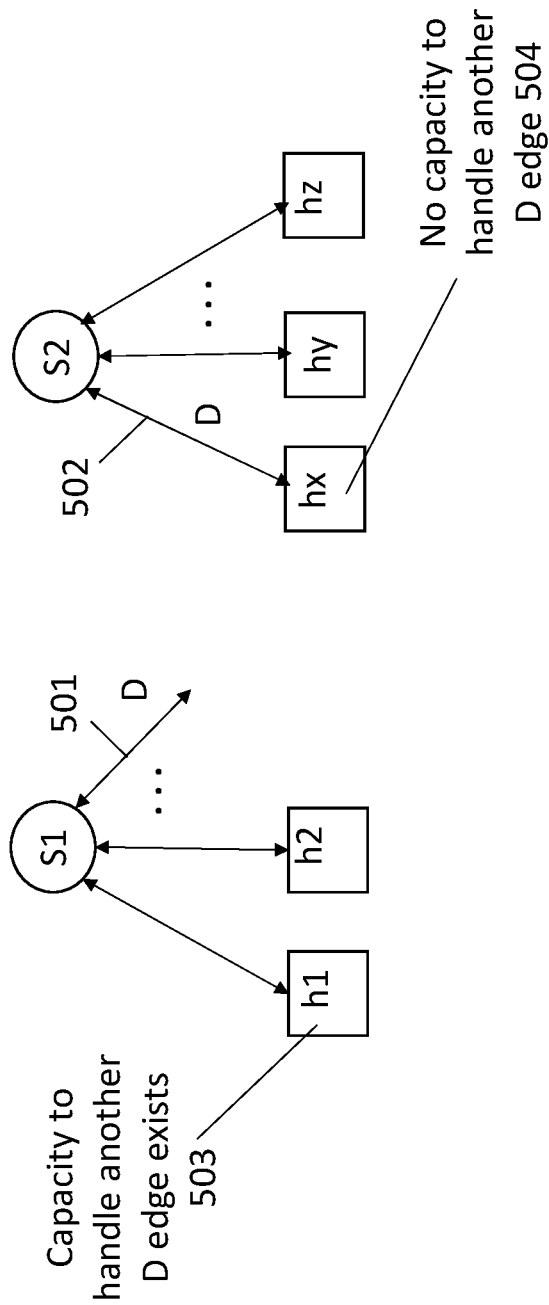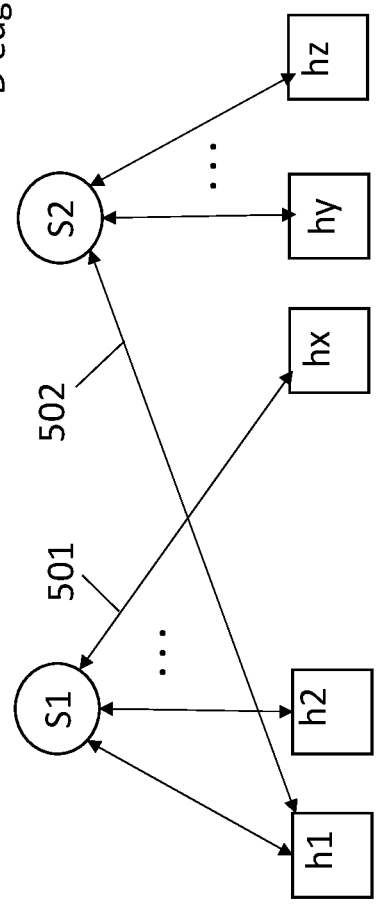

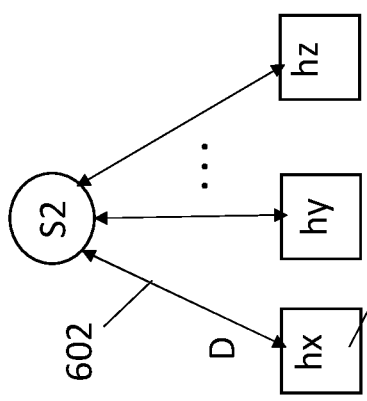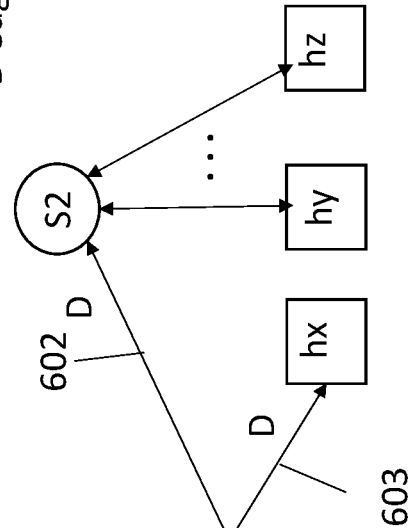
Fig. 6a
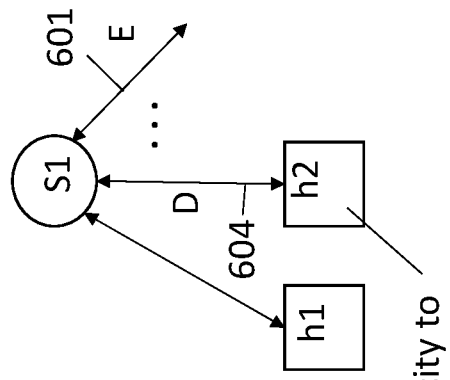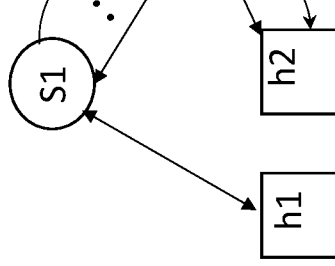
Fig. 6b

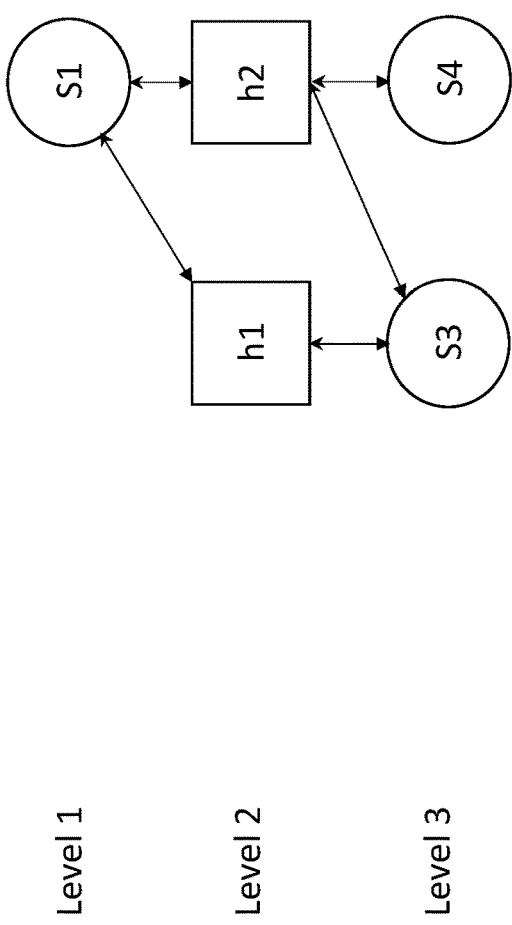

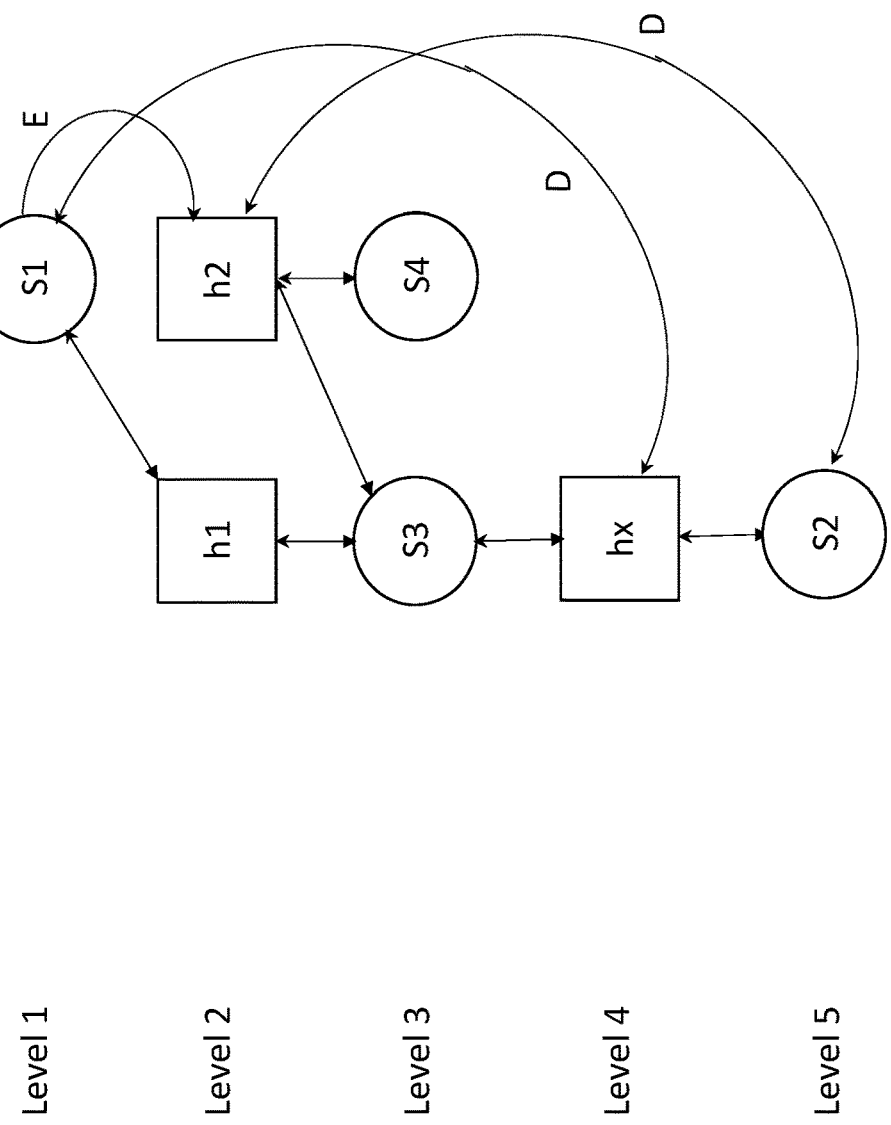

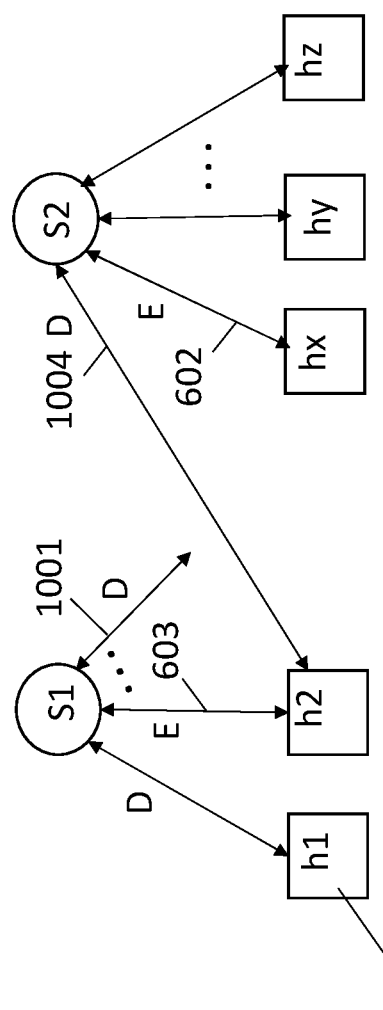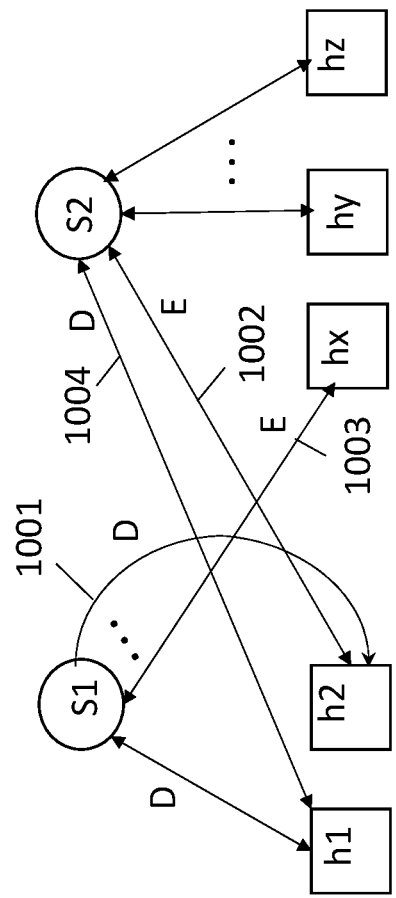

DATA PLACEMENT IN LARGE SCALE OBJECT STORAGE SYSTEM

FIELD OF INVENTION

The field of invention pertains generally to the computing sciences, and, more specifically, to a method and apparatus for implementing changes to a file system that is emulated with an object storage system

BACKGROUND

With the emergence of big data, access to large volumes of information is becoming an increasingly important parameter of the performance and/or capability of useful applications. Unfortunately, the larger a storage system's overall capacity, the more difficult it becomes to maintain and manage.

FIGURES

Figure 1:
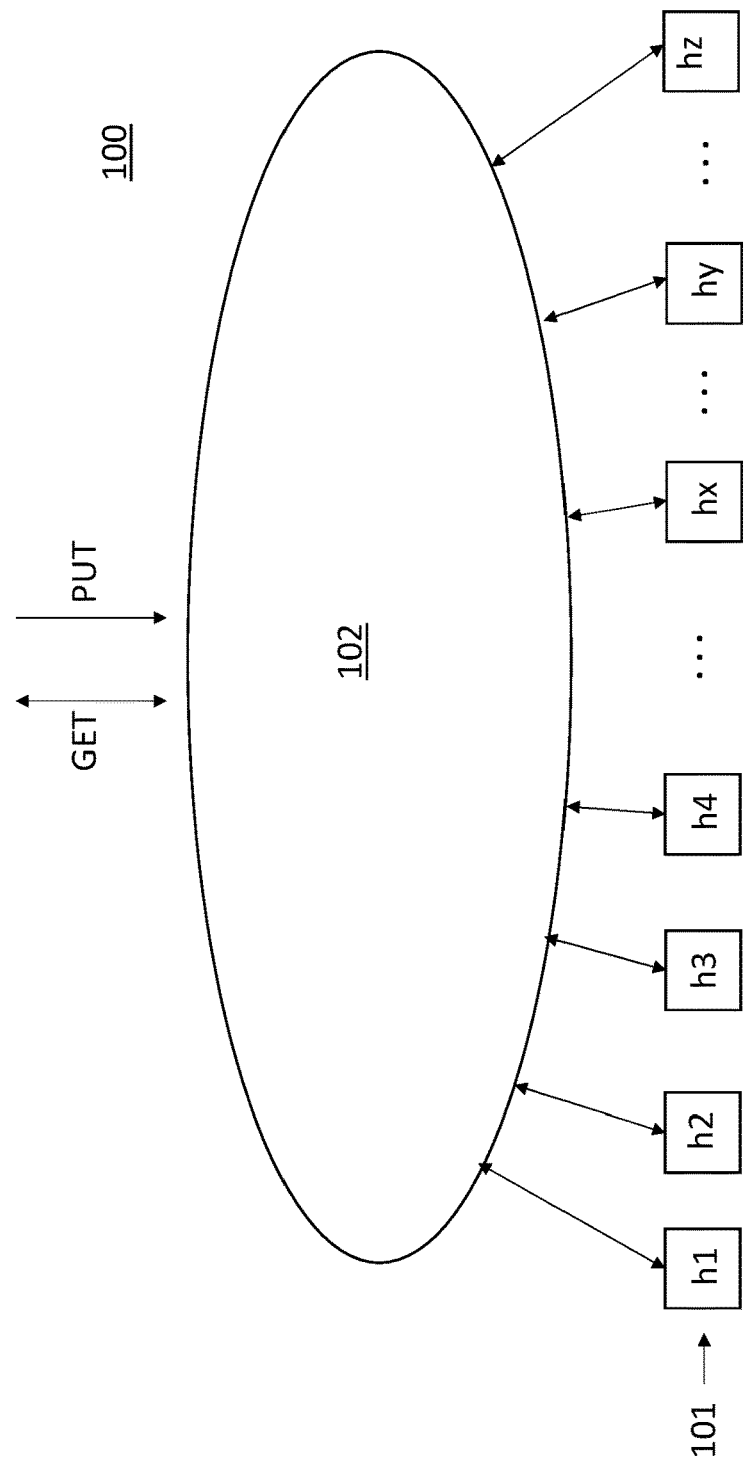
Figure 2:
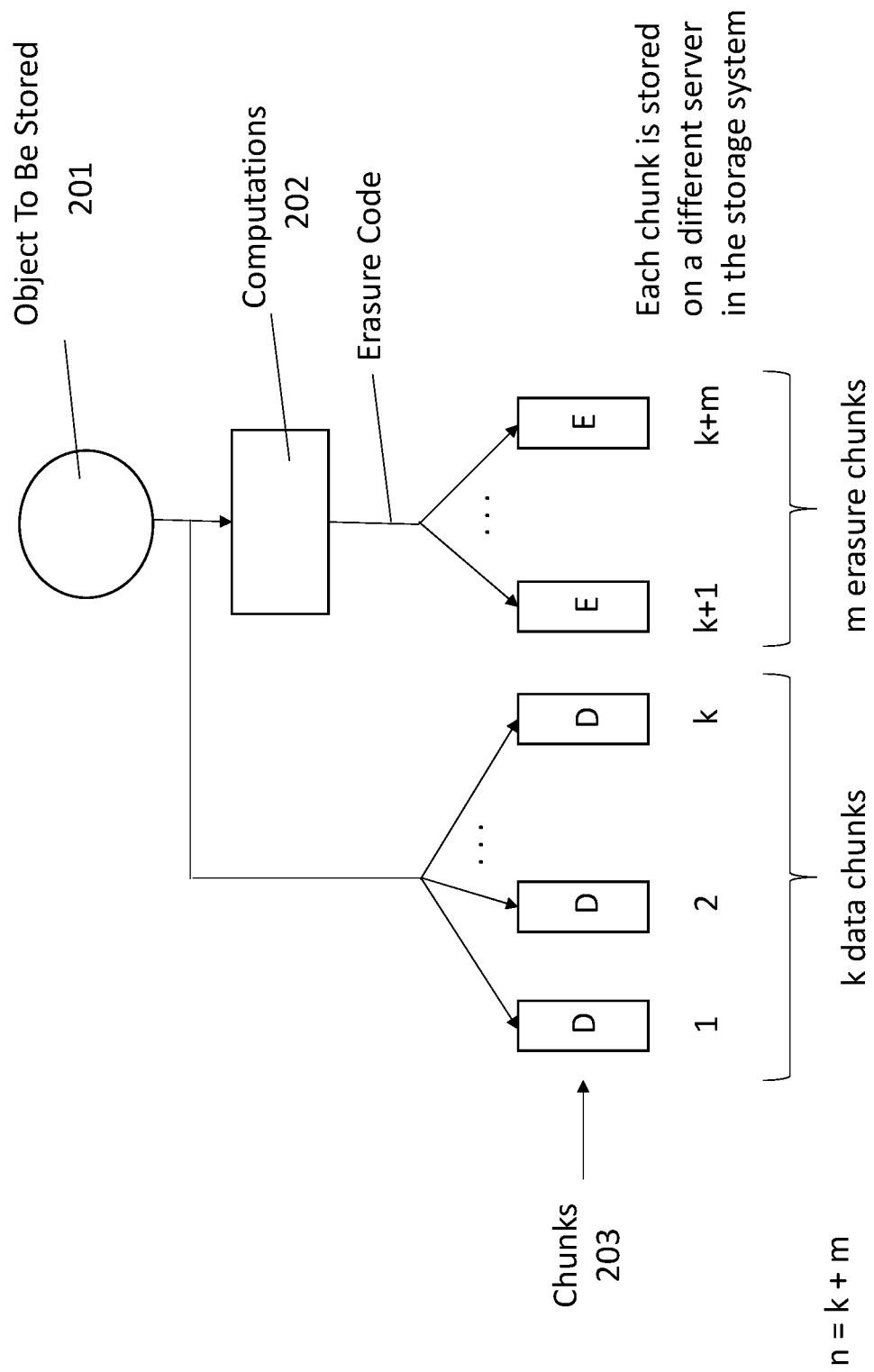
Figure 3:
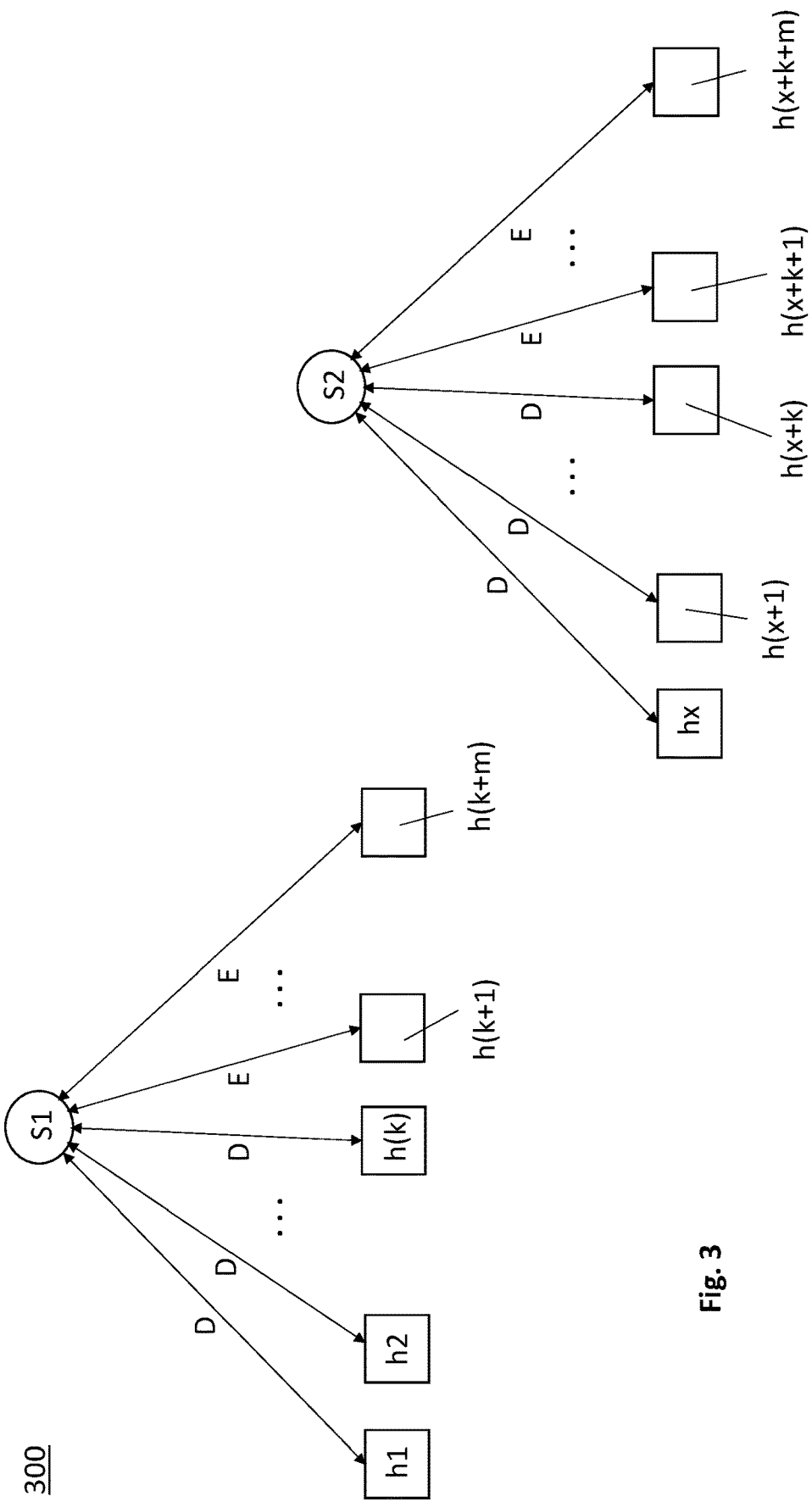
Figure 4:
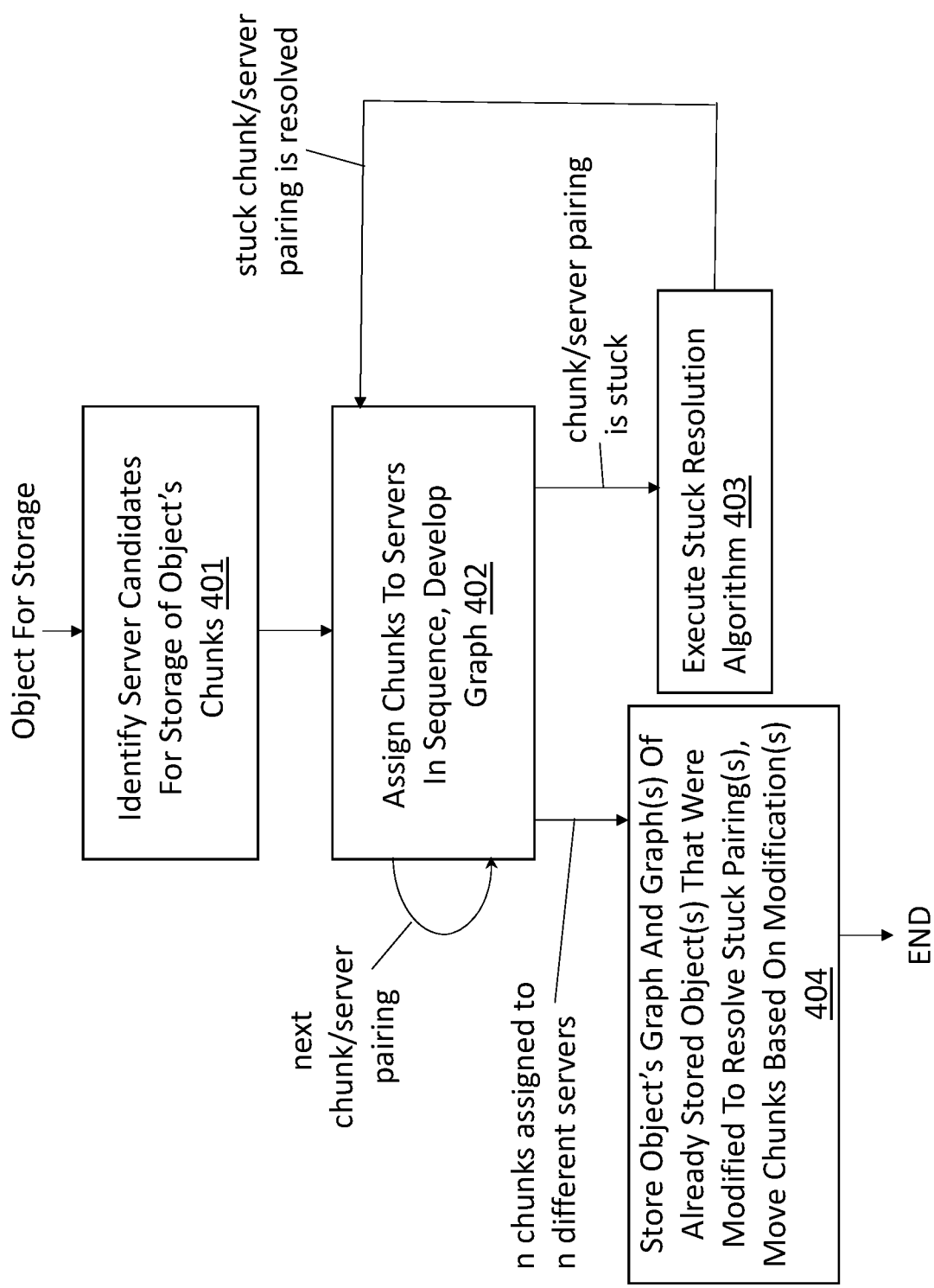
Figure 7:
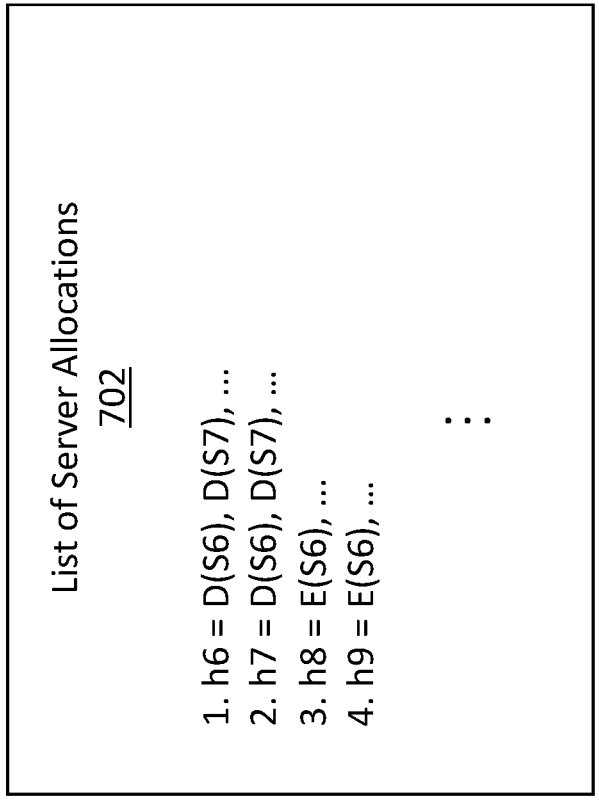
Figure 11:
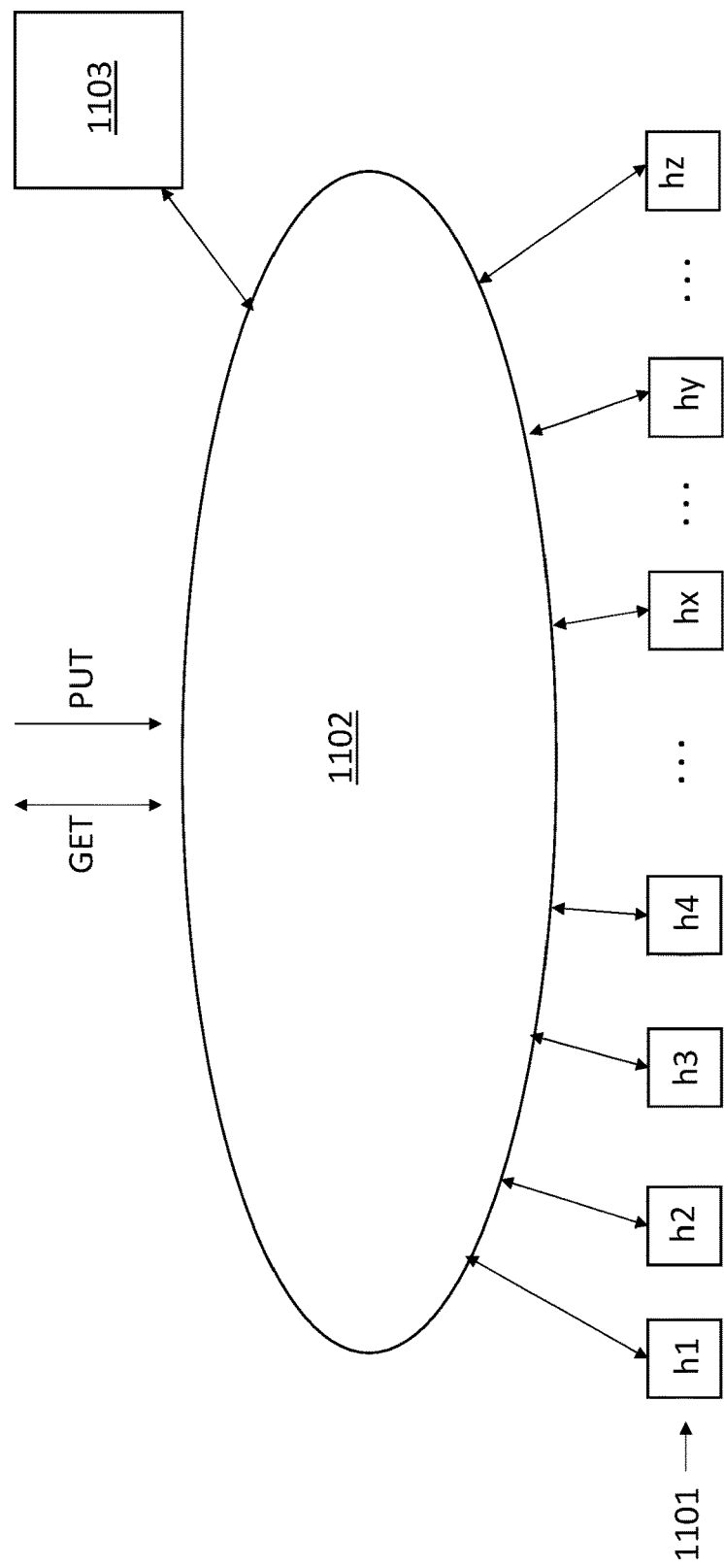
Figure 12:
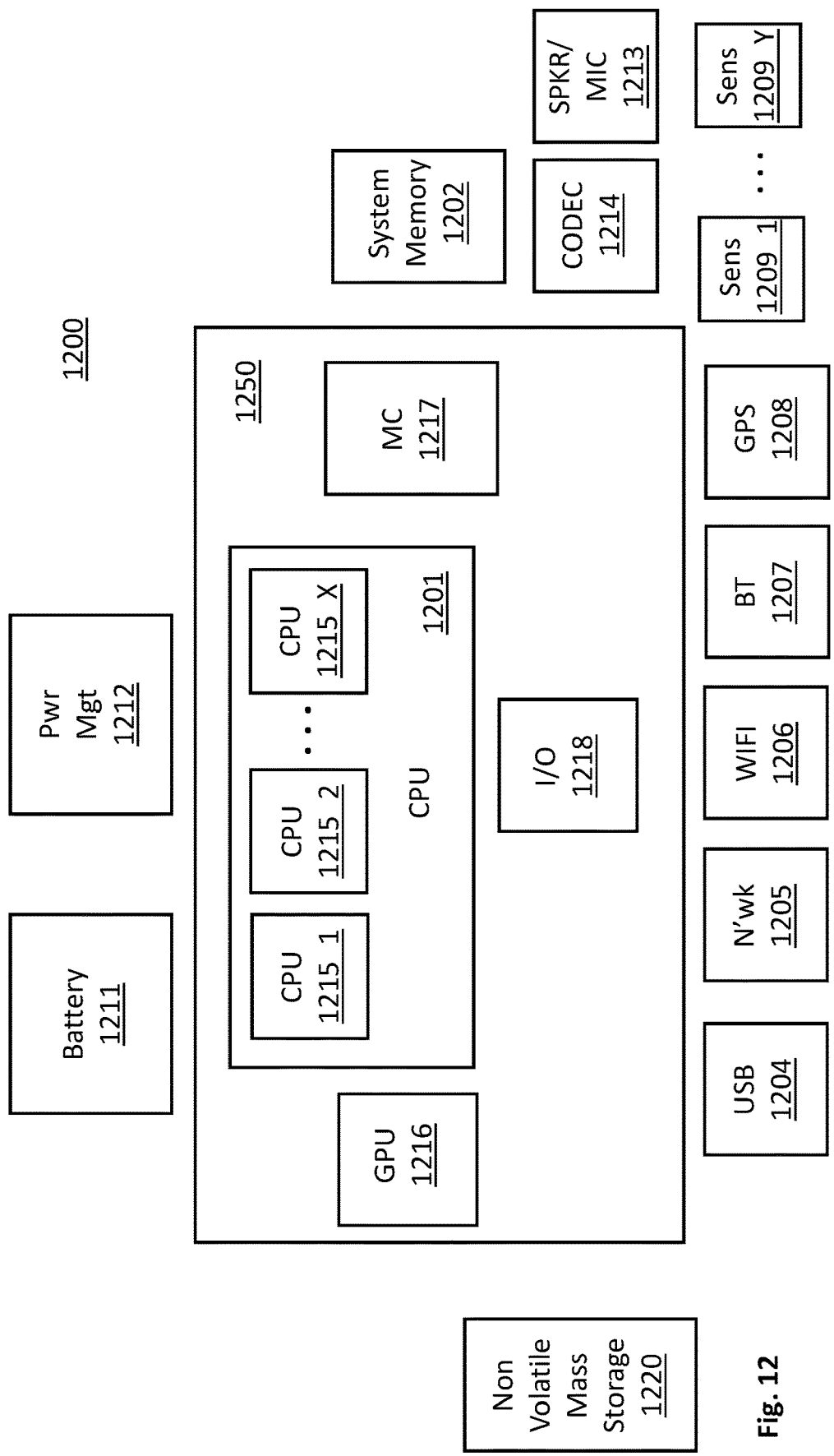

A better understanding of the present invention can be obtained from the following detailed description in conjunction with the following drawings, in which:

FIG. 1 shows an object storage system (prior art);
FIG. 2 shows an erasure coding scheme (prior art);
FIG. 3 shows a pair of graphical storage groups;
FIG. 4 shows a method for constructing a graph as part of the process for storing an object in an object storage system;
FIGS. 5a and 5b pertain to direct method of resolving a stuck edge;
FIGS. 6a and 6b pertain to an indirect method of resolving a stuck edge;
FIG. 7 shows a list of storage group definitions and a list of server allocations;
FIGS. 8a, 8b, 8c, 8d, 8e and 8f depict an expansion of a storage group;
FIG. 9 shows a method for resolving a stuck edge of a graph under construction for an object to be stored in an object storage system;
FIGS. 10a and 10b pertain to a back-up method of resolving a stuck edge;
FIG. 11 shows an improved object storage system;
FIG. 12 shows a computing system.

DESCRIPTION

FIG. 1 shows a large scale object storage system 100. As observed in FIG. 1, the storage system 100 includes a large number of server computers 101 that act as the physical non volatile storage resources of the system (e.g., hard disk drives (HDDs) and/or solid state drives (SSDs) that are plugged into the servers 101 correspond to the physical non volatile storage devices of the overall storage system).

The server computers 101 are coupled to a large scale network 102 (e.g., wide area network, metropolitan area network, etc.). Items of stored information are accessed by submitting a particular type of request (e.g., GET, PUT) to the network 102. The network routes the request to the appropriate server computer where the item of stored information that is targeted by the request is stored.

As is known in the art, an object storage system assigns unique identifiers to the different items of stored information, referred to as "objects", which contain the pertinent stored content, e.g., files, documents. Typically, an object's unique identifier is used to generate a network address for that object (or is used as a network address for that object).

A request that targets a particular object simply includes the unique identifier for the object in the request. The unique identifier is then used as a basis for the network to route the request to the correct server computer 101.

The operation of an object storage system 100 as described just above is distinct from traditional non volatile storage systems which rely on a filepath to reach a targeted item (the file system is organized according to a hierarchical structure and the path through the hierarchy (the filepath) needs to be specified in the request). The assignment of unique identifiers to separately stored items of information, and the use of the identifiers as a basis for routing requests to the correct storage destination, allows object storage systems to more readily scale to extremely large systems (e.g., petabytes or higher) than traditional file systems.

Nevertheless, simply because of the size of the storage system (e.g., in terms of numbers of servers), the administration/management/organization of an extremely large scale object storage system presents challenges.

FIG. 2 shows a high level view of the storage of an object 201 that is protected with an erasure code. As observed in FIG. 2, numerical computations 202 are performed on the object's information to generate an erasure code. The object's information/content and its erasure code are then broken down into n total chunks 203 where k chunks are composed of the object's information/content (hereinafter, "data chunks") and m chunks are composed of the object's erasure code (hereinafter, "erasure chunks").

The data and erasure chunks are then stored, e.g., as separate objects, on different servers within the object storage system. Specifically, the k data chunks are stored on k different servers and the m erasure chunks are stored on an additional m different servers. If any of these servers fail and its corresponding chunk is lost, the object's original information/content can be recreated by performing numerical computations on the remaining chunks. In various approaches, chunks are same sized across all data and erasure code chunks.

Load balancing is an attempt to spread stored data (both data chunks and erasure chunks) evenly across the storage resources of the system. Here, referring back to FIG. 2, the storage system is presumed to include many more storage servers than the particular n servers that are used to store the n chunks of the single object 201 to which FIG. 2 pertains.

That is, in operation, the object storage system is expected to receive a large number of storage requests for different objects, each of whose n chunks can be stored across any combination of servers in the system. According to general load balancing principles, the capacity utilization of all servers in the system, ideally, should be the approximately the same.

A challenge is the effect that a new server has on the distribution of stored information across the storage system's servers. Here, a newly added server will be the most under utilized in the system at the moment of its addition. Storing all new objects on the new server to quickly increase its utilization is not an option because of the requirement that the chunks for any object are to be distributed across n total servers. As such, the addition of a new server to the system includes the process of moving various chunks of already stored objects to the new system to bring-up the new server's utilization. However, the movement of chunks within a storage system between servers adds overhead.

FIG. 3 pertains to an improved object storage system that efficiently distributes chunks across the storage system's servers. The efficient distribution of chunks includes the limited movement of chunks between servers under certain, predefined conditions where such movement is warranted.

As observed in FIG. 3, the storage system identifies and tracks a "storage group" for each object that is stored on the system. The storage group for a particular object is the total group of n servers used to store the chunks for that object (k servers that are used to store the object's data chunks and the m servers that are used to store the object's erasure chunks). Importantly, in various embodiments, a graphing approach (e.g., a Bipartite graph model) is maintained by the storage system that describes each object's storage group.

The graphing approach, as will be made more clear in the following discussion, maps the storage of each object's respective chunks into its respective servers. As such, the mapping can be analyzed by the system to understand, e.g., the capacity utilization of each server, and, conditions that warrant a move of chunks stored on one server to another server. Both the construction of the graphs and the processing of the graphs, in various embodiments, is performed on representations of the graphs that describe the graphical information in formats that are comprehendible to a computer and/or computer software. For ease of discussion, such representations of graphs will hereinafter simply be referred to as "graphs" and the like.

FIG. 3 shows a mapping for two stored objects. Here, as can be seen in the mapping, a first storage group s1 is associated with a first stored object and a second storage group s2 is associated with a second stored object. The storage groups and the their respective servers h* have respective vertexes (nodes) in the graph. The specific servers that are used to store the chunks for a particular object are recorded in the graph by connecting the servers respective vertexes to the vertex that represents the objects storage group.

Thus, for example, the first object has its k data chunks stored on severs 1 through k and its m erasure chunks stored on servers k+1 through k+m. As such, a connection (referred to as an "edge") is drawn between the respective vertex for each of these servers and the respective vertex for the first object's storage group s1. Additionally, each edge is labeled to indicate whether its corresponding server is storing a data chunk or an erasure chunk for the particular object.

Thus, the edges that connect to servers 1 through k are labeled "D" (for data) and the edges that connect to servers k+1 through m are labeled "E" (for erasure). In an embodiment, consistent with the discussion of FIG. 2, a server is not allowed to store more than one chunk for any particular data object. As such, for each storage group, the vertex that represents the storage group is connected to n different server vertexes (said another way, only one edge is allowed to exist between the vertex for any particular server and the vertex for any particular storage group).

The graph for the second object follows a similar strategy. In the particular example of FIG. 3, however, servers hx through h(x+1) are used to store the second object's data chunks and servers h(x+k) through h(x+k+m) are used to store the second object's erasure chunks. As such, the vertex s2 that represents the second object's storage group is connected to the vertexes that represent servers hx through h(x+1) with "D" edges and the vertexes that represents servers h(x+k) through h(x+k+m) with "E" edges.

As depicted the pair of storage groups are completely isolated (the pair of storage groups do not share a single, same server). However, in practice, many storage groups would share one or more servers.

As FIG. 3 only shows the storage group mappings for two objects, note that an extremely large number of such mappings would exist when an extremely large number of data objects are stored in the storage system. Thus, the storage system is apt to record a large number of bipartite graph storage groups and a correspondingly large number of different combinations of server utilizations across storage groups (in theory, without the capacity restrictions described below, the chunks of any object can be stored on any combination of m servers in the system).

Additionally, assuming the servers have large storage capacities, the vertex for any particular server can have a large number of edges connected to it (e.g., one edge for each chunk stored by the server). In an embodiment, if a server has capacity C, the utilization of that capacity is partitioned such that only (k/n)C can be used for the storage of data chunks and (m/n)C can be used for the storage of erasure chunks. Different servers can have different capacities so the raw number of data chunks and erasure chunks that can be stored by a server can vary from server to server.

Regardless, however, each server has a fixed percentage of its capacity devoted to the storage of data chunks and a fixed percentage of its capacity devoted to the storage of erasure chunks consistent with erasure encoding scheme (n=k+m). Imposing this restriction prevents an imbalance of too many data chunks or too many erasure chunks being stored on any particular server.

For example, if a server having more than (k/n)C data chunks were to fail, more than (k/n)C objects would have to have their erasure chunks processed in order to recover the objects content which would consume a proportional amount of additional processing resources than if the server only (k/n)C data chunks. The additional processing resources, in turn, corresponds to an inefficiency in input/output (I/O) performance of the overall system. As such, assuming the risk of failure is equal across all servers in the system, it is better to spread the performance degradation associated with erasure chunk processing equally across all servers, which, in turn, drives the (k/n)C and (m/n)C partitioning requirement.

According to an embodiment, as part of the process for storing a new object in the system, servers are identified for the storage of that object's chunks. For example, a hash could be performed on the object's content which returns the respective identities of multiple candidate servers for storing the object's chunks.

According to one approach, referring to FIG. 4, after a list of candidate servers has been generated 401 for the chunks of an object to be stored, chunk/server pairings are performed in sequence. 402 That is, a first server is identified for the first data chunk, a second server is identified for the second data chunk, etc. until a kth server is identified for the kth data chunk. Then, a (k+1)th server is identified for the first erasure chunk, a (k+2)th server is identified for the second erasure chunk, etc. until an nth server is identified for the mth erasure chunk.

Assuming each candidate server that is identified to store a particular chunk has available capacity to store that chunk, the pairings proceed forward without issue (n pairings are performed in sequence) and the object's storage group is committed (respective object IDs are assigned to the chunks that cause them to be stored in the correct servers). In this case, the object's storage group graph is stored 404 and the process ends.

In certain cases, however, no such available server can be found. Here, for instance, a large number of servers (or at least a large number of the servers identified for pairing with an object's chunks) have reached one or both of their capacity thresholds and are not able to store another data chunk or erasure chunk.

In such a circumstance, the process of forming an object's storage group is said to be "stuck". That is, when the process of pairing a particular chunk with a server was attempted, no server from the list of candidate servers had additional capacity to store the chunk. For example, in the case of a data chunk, all candidate servers reached their (k/n)C capacity). Or, in the case of an erasure chunk, all candidate servers reached their (m/n)C capacity.

In this case, a stuck resolution algorithm 403 is executed to resolve the stuck pairing attempt to an un-stuck state. In an embodiment, execution of the stuck resolution algorithm 403, as described in detail immediately below, includes analyzing the bipartite graph of the storage group that has been developed thus far for the object being stored, and, analyzing the bipartite graph(s) of one or more storage group(s) for objects that are already stored in the system.

The objective of the graphical analysis is to identify another server (that was not an initial candidate for the object's chunks) that can be used to resolve the stuck pairing attempt. In various embodiments, the graphical analysis and resolution 403 is performed for each of the stuck storage group's stuck pairings (it is possible that multiple pairings of a same storage group are stuck after the initial chunk/server pairing phase).

After successful resolution of all stuck pairing attempts and completion of n chunk/server pairings for the object, the pairings are committed and the object's storage group graph is saved 404. As will be more apparent in the following discussion, the storage group of a previously stored object can be modified in order to help resolve the stuck pairing. Such modification(s) can result in re-assignment of chunks of the previously stored object to a new server.

In this case, the corresponding changes made to the graph of the previously stored object are also saved 404 (e.g., the new graph has an edge that terminates at a different server than before). Moreover, the re-assignment is physically implemented in hardware (the chunks are physically transported over the storage system's network from their old server to their new server 404) and committed (the moved chunks are given new object IDs that correspond to their new server). Notably, the stuck resolution algorithms aim to minimize chunk movements so that minimal overhead results from the resolution of the stuck pairing.

Various processes employed by the stuck pairing resolution algorithm 403 are described immediately below. As described above, the algorithm 403 analyzes and processes the graph being developed for the storage group of the object being stored and the graphs of the storage groups of other objects that already stored in the system that assist in the resolution process. The figures and discussions below therefore pertain to the graphs and how they can be used to resolve the stuck situation.

In various embodiments there are two basic resolution mechanisms. A first, referred to as "direct" is described with respect to FIGS. 5a,b and a second, referred to as "in-direct" is described with respect to FIGS. 6a,b.

With respect to the direct case, FIG. 5a depicts a first storage group S1 with a stuck pairing 501. Specifically, a vertex for a server (hereinafter simply "server") cannot be found to terminate an edge 501 that emanates from the vertex for the storage group S1 of the object being stored (hereinafter simply "storage group").

Notably, the development of storage group S1 has already had success finding servers to pair with the first two edges that were processed 402 for the storage group. Specifically, server h1 had capacity to handle an edge for S1 and sever h2 had capacity to handle an edge for S1. More specifically, both edges have a specific type and both h1 and h2 had capacity to store one more edge of their respective type.

In the direct resolution case, as of the moment the stuck condition is present for edge 501, certain conditions are looked for in the storage group S1 of the object being stored and the storage group S2 of another object that is already stored in the system.

In an embodiment these conditions include: 1) available capacity 503 exists in one of the stuck storage group's already assigned servers (h1) for another edge of the same type as the stuck edge 501; and, 2) an edge 502 of the same type as the stuck edge 501 exists between the other storage group S2 and a server hx that is not within S1; 3) the sefver hx in the other storage group S2 does not have available capacity to handle another edge of same type as the stuck edge 504.

In the specific example of FIG. 5a, the stuck edge 501 is of type D, there is excess capacity for at least one more D edge in h1, there is a D edge 502 between S2 and hx, and hx does not have capacity to handle another D edge. Therefore, the above conditions are met (the same conditions could also be met if all instances of D above were replaced by E).

Upon meeting these conditions, referring to FIG. 5b, the algorithm then proceeds to disconnect the edge 502 from the other server hx within the other storage group S2 and reconnect it to the server h1 in the stuck storage group S1. Here, from the conditions above, h1 has available capacity to handle the D edge 502. This move "frees up" server hx to take on edge 501 (with the removal of D edge 502 from hx, hx now has the capacity to take on another D edge). As such, edge 501 is connected to hx and the stuck condition is resolved.

Essentially, the direct method uses excess capacity in the stuck storage group S1 to free-up maxed-out capacity in another storage group S2, where, the excess capacity (of h1), the maxed capacity (of hx) and the stuck edge are all of the same type. Notably, the excess capacity in h1 cannot be used to accept the stuck edge 501 because of the storage group rule that a server can have only one edge to a storage group. Although the particular example of FIG. 5a,b is directed to a D type scenario, the same algorithm can be applied if the excess capacity, maxed capacity and stuck edge were all of E type.

In the indirect case, referring to FIG. 6a, the looked for conditions include: 1) available capacity 603 in a server h2 of the storage group S1 having the stuck edge 601 is the same type (E) as the stuck edge 601; 2) an edge 604 between another server h1 in the stuck storage group s1 has an opposite type (D) than the stuck edge 601; 3) an edge 602 between a server hx in another storage group s2 has an opposite type (D) than the stuck edge 601; 4) the server hx in the other storage group S2 does not have capacity 605 to accept another edge of either type (D or E) and is not a member of the stuck storage group S1.

Upon meeting these conditions, the algorithm then proceeds to disconnect the edge 604 between the server h2 having the additional capacity and S1, and, disconnect the edge 602 between the other server hx and the other storage group S2. Again, both of these edges 604, 602 are of same type (D). Thus, the disconnect frees up both servers h2, hx to take on another D edge. The edges 604, 602 are then re-connected in a swapped fashion. That is, edge 604 is connected to hx and edge 602 is connected to h2 (S1 is now connected to hx and S2 is now connected to h2). Thus, edges

604, 602 have been swapped so that the consumed D storage space of h2 and hx remains unchanged. The stuck edge 601 then connects to h2.

Thus, from the initial state of FIG. 6*a*, server h2 had the capacity to take on an E edge but could not take on the stuck edge 501 because it would add a second edge between h2 and S1. Additionally, h2 did not have the capacity to take on another D edge and hx did not have the capacity to take on a D or E edge. Nevertheless, according to the indirect resolution method of FIGS. 6*a* and 6*b*, the stuck edge 601 was able to be resolved with a valid solution.

Thus, in operation, the storage system uses a graph method to construct a storage group for a new object to be entered to the system for storage. A number of servers in the system are identified as candidates for the object's n chunks to be stored across. However, when the system's servers (or at least the candidate servers) are reaching capacity levels for both D and E type chunks, it becomes more likely that the process of constructing the storage group will become stuck. That is, a server cannot be found having the capacity to take on the next edge to be placed in the storage group.

Under these conditions, assuming other servers having been found to take on already placed edges for the storage group, such servers are likely to have available storage space to take on additional edges (their capacities have not yet been reached). However, such servers cannot take on the stuck edge because they already have an edge that is committed to the storage group. The direct and indirect stuck resolution methods described just above with respect to FIGS. 5*a,b* and 6*a,b* re-arrange the edges of the storage group under construction and another storage group that represents an object that is already stored in the system to utilize the available storage space without offending the requirement that only one edge can exist between a particular server and a particular storage group.

Once the stuck condition is resolved graphically, assuming the storage group is able to similarly resolve all other stuck edges and reach completion, the re-configured graphs are committed to the storage system's physical hardware 404. In the case of the direct edge re-arrangements of FIGS. 5*a,b*, the chunks that were stored on hx for the object that S2 represents will be physically moved (sent over a network) from the actual server that the hx vertex represents to the actual server that the h1 vertex represents.

In the case of the indirect edge re-arrangements of FIGS. 6*a,6b*, the chunks that were stored on hx for the object that S2 represents will be physically moved (sent over a network) from the actual server that the hx vertex represents to the actual server that the h2 vertex represents. For both the direct and indirect approaches, new object IDs are assigned to the moved chunks to reflect their new storage location. Chunks need not be moved from any of the S1 servers because the object that S1 represents has not yet been physically stored.

Notably, both the direct and indirect resolution methods described above assume the presence of another storage group S2. In an embodiment, the other storage group is "discovered" by "expanding" from the servers that are already committed to the stuck storage group. For example, in both of the examples of FIGS. 5*a,b* and 6*a,b*, the h1 and h2 servers were already committed to the stuck storage group S1.

Here, the h1 and h2 servers are presumed to be storing chunks for other objects and other storage groups. As such, with respect to the graph information, there are many edges that terminate at h1 and h2 other than those depicted. For example, if h1 is storing the chunks of 1M different objects, the graph information maintained by the system includes 1M different edges that uniquely connect to 1M different storage groups.

Thus, in various embodiments, as observed in FIG. 7, the graphical information is recorded as a list of storage group definitions 701 and a list of server allocations 702. The list of storage group definitions 701 has a separate entry for each storage group in the storage system. Each listing identifies each server and its edge connection type within the storage group (e.g. "S6=h6(D)" means server h6 is connected to storage group S6 by a D edge). Likewise, the list of server allocations 702 has a separate entry for each server in the storage system and identifies the edges that are connected to that server (e.g., "h6=D(S6)" means server h6 has a D type edge with storage group S6"). The lists of storage group definitions 701 and server allocations 702 can be stored in a centralized fashion or largely distributed fashion, or some combination thereof, in any storage resource of the storage system (e.g., including a special region of the system's storage allocated for maintenance and control).

In an embodiment, a special syntax is used to name each edge that uniquely identifies the edge's storage group, server and edge type (e.g., the name of edge 604 in FIG. 6*a* would be [1;2;D] where "1" identifies the storage group S1, "2" identifies server h2 and "D" identifies the edge type). Thus, during construction of a storage group, when a new edge is committed, the edge's name is recorded in both the list of storage group definitions 601 and the list of server allocations 602.

When the placement of a next edge becomes stuck during the construction of a storage group, the graphical information lists are iteratively processed to build an expansion from the storage group under construction. The expansion is then analyzed to find another storage group (e.g., s2 in FIGS. 4*a,b*, and 5*a,b*) having a server that can be used to help resolve the stuck condition.

Figure 8A:
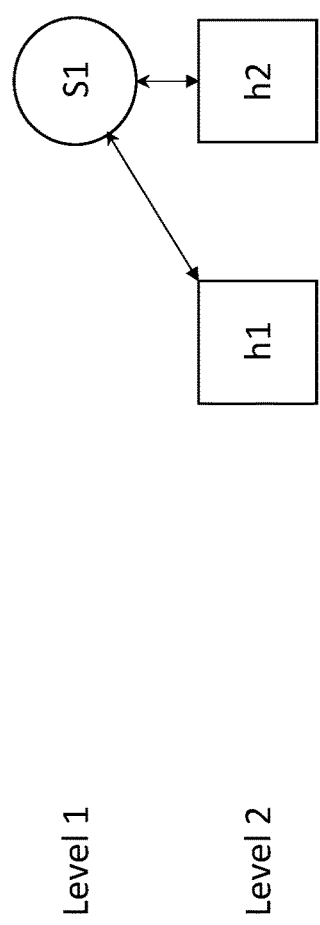
Figure 9:
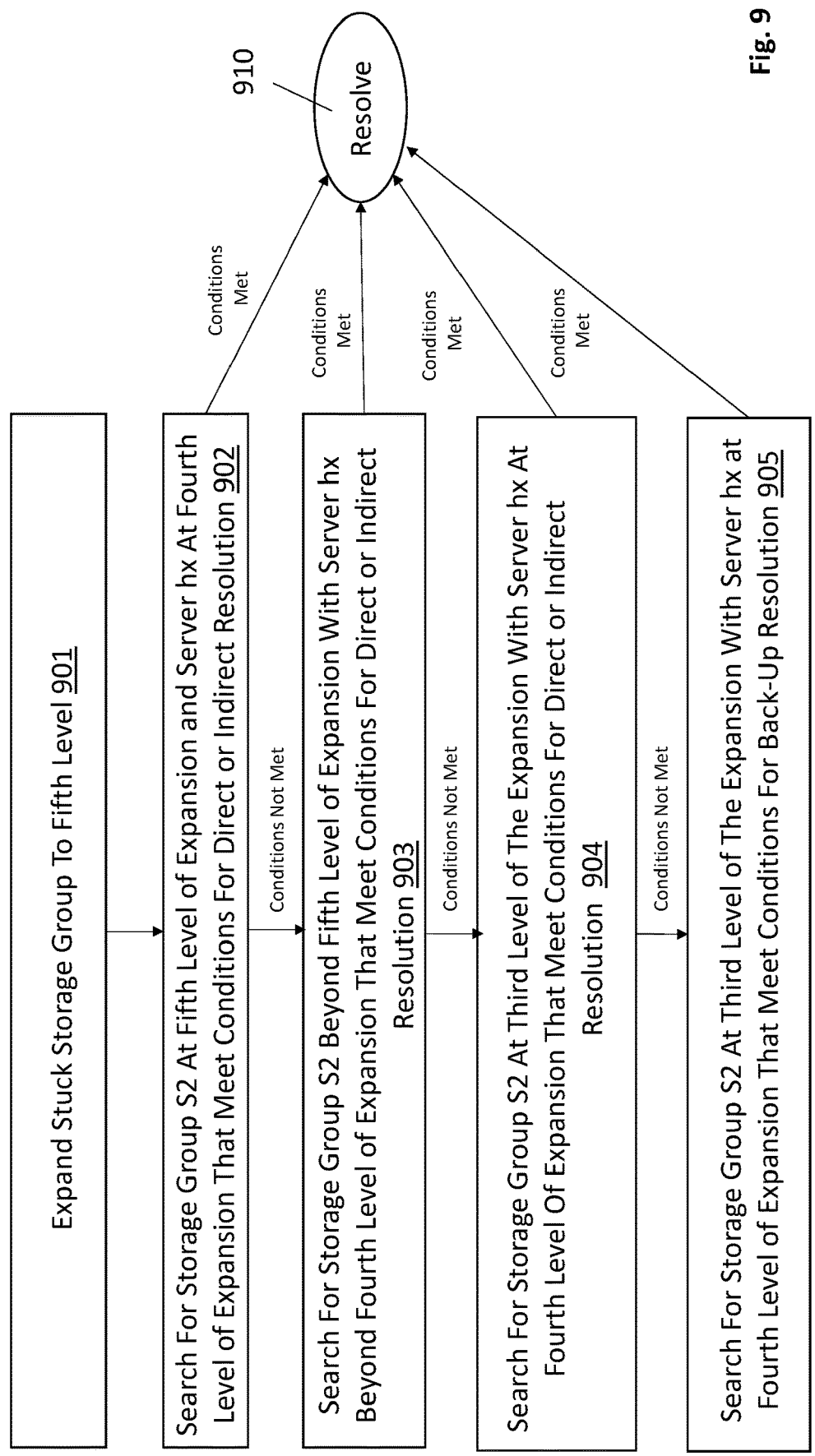

FIGS. 8*a* through 8XXX depict an example of an expansion from the same stuck condition as FIGS. 4*a* and 5*a*. FIG. 8*a* re-presents the committed state 801 of the storage group under construction S1 at the moment it becomes stuck. Here, the two servers h1 and h2 are committed to the S1 group at the moment S1's construction becomes stuck. FIG. 7*a* shows the first and second levels of the expansion. Namely, the storage group under construction S1 is placed at the root or first level. The servers that are committed to S1 are then placed in the immediately lower, second level of the expansion. The s1-h1 and s1-h2 edges are also drawn in the expansion.

Here, once the stuck state of the storage group under construction is expressed in the expansion, the list of server allocations 602 is accessed to identify the edges that are connected to h1 and h2 and express them in the expansion. For the sake of easy explanation, as observed in FIG. 8*b*, the edge list for server h1 lists only one edge (other than the edge to s1) that is a member of the s3 storage group and the edge list for server h2 lists only two edges (other than the edge to s1) that are members of the s3 and s4 storage groups, respectively. In practice, however, the edge lists for the servers could each contain millions or billions of edges (or more) as the overall algorithm is often applied as server capacities are being reached. The s3 and s4 storage groups can be readily identified from the edge name syntax that includes a component that identifies the storage group that the edge is a component of.

FIG. 8b depicts the expansion 802 after the edge list information for servers h1 and h2 are added. As observed in FIG. 8b, the s3 and s4 storage groups are added to the next, third level.

After the s3 and s4 storage groups are added to the third level of the expansion, the storage group list 601 is accessed and the server and edge definitions for s3 and s4 are processed and incorporated into the expansion.

Figure 8C:
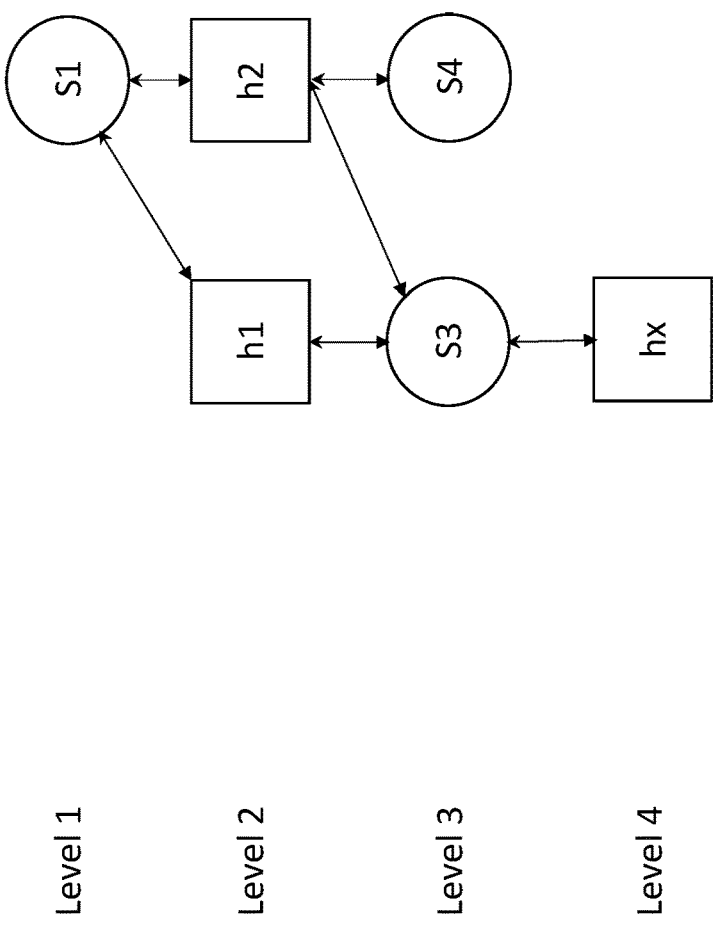

Referring to FIG. 8c, every server other than h1 and h2 that is identified in the storage group definitions 601 is added to a fourth level of the expansion 803 along with its respective edges to S3 and S4 as appropriate. For the sake of easy explanation, only a single server hx from the S3, S4 storage group definitions is actually depicted in FIG. 8c (in practice, each storage group will have n servers, one or two of which could be h1 and/or h2, and all of which could be added to the expansion).

Figure 8D:
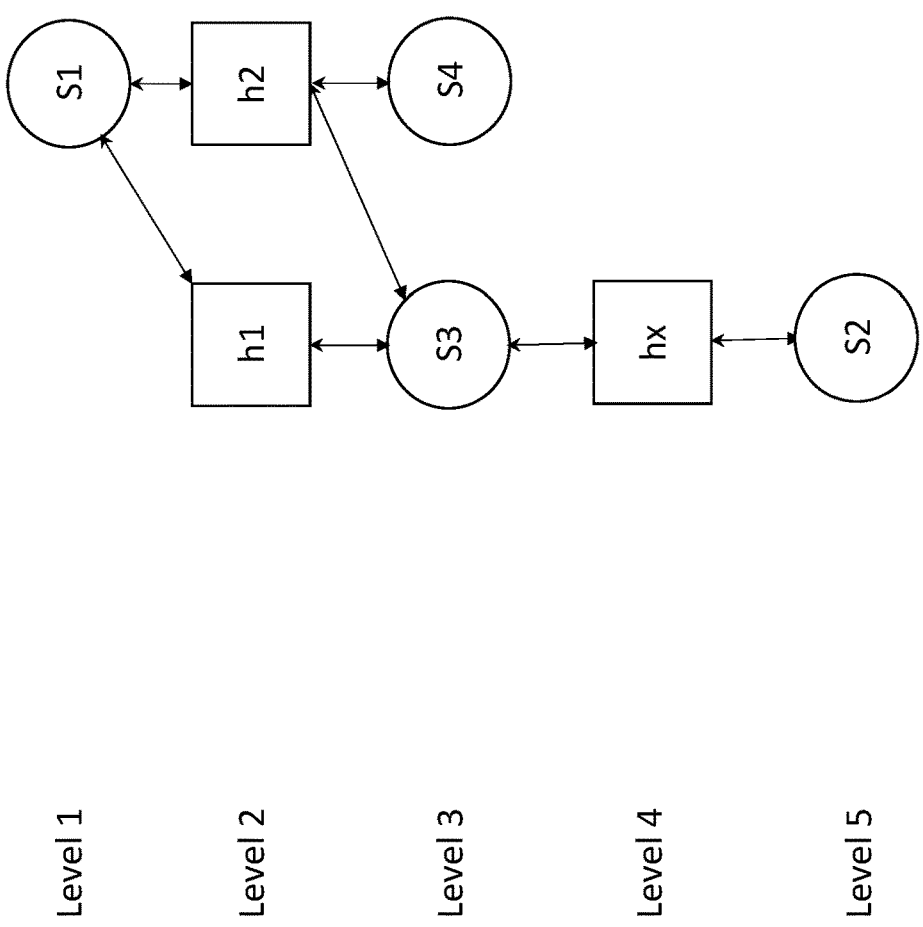

In response to the expansion 803 of FIG. 8c, referring to FIG. 8d, the list of server allocations 602 is again accessed and the edge list for server hx is processed and incorporated into a fifth level of the expansion. For the sake of easy explanation, the edge list for server hx lists only one edge that is a member of the S2 storage group.

Figure 8E:
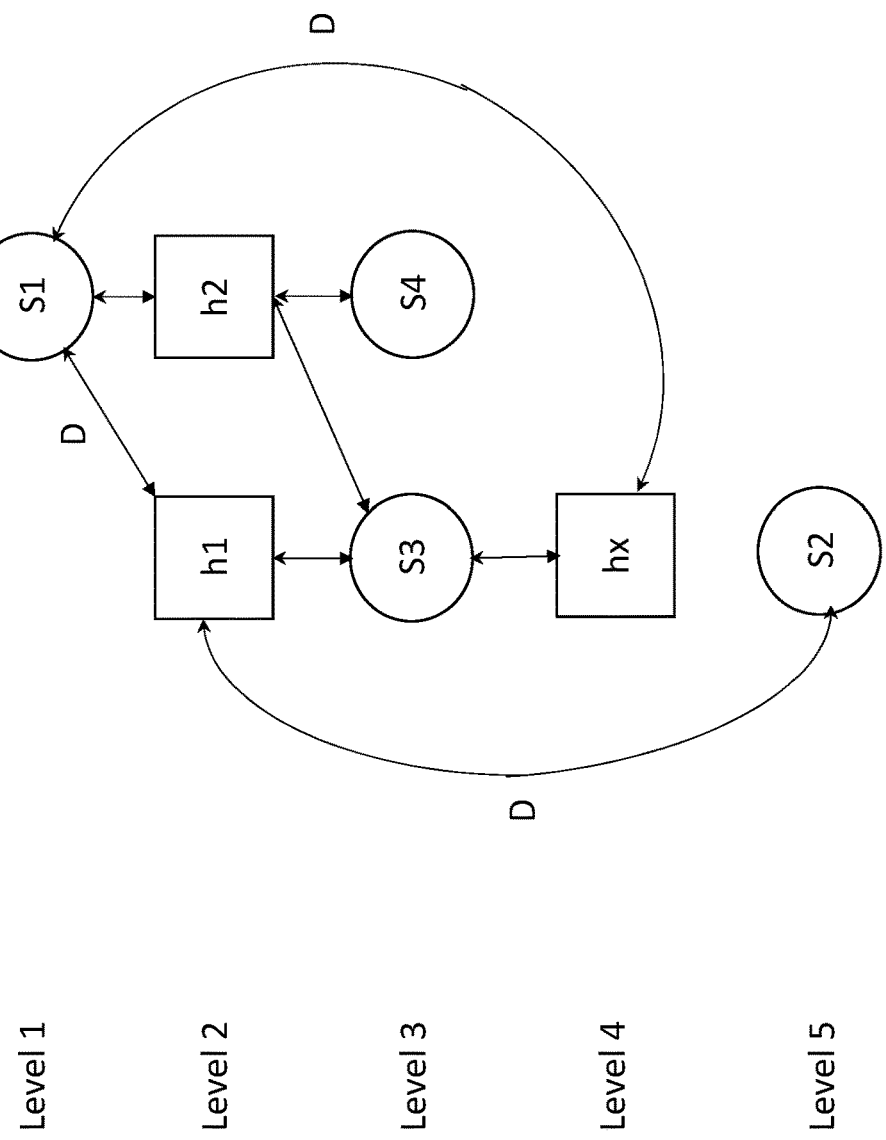

At this point, even if the hx server has no more capacity to accept an edge of the same type as the stuck edge, the direct stuck resolution method of FIGS. 5a,b can be applied if one of servers h1 and h2 has the capacity to accept another edge of the same type as the stuck edge. FIG. 8e shows modification of the expansion to reflect this particular resolution in the case where h1 can accept another edge of the same type as the stuck edge. Thus, FIG. 8e is essentially a reproduction of FIG. 5b Alternatively, if the hx server has no more capacity to accept edges of either type, and one of servers h1, h2 has both the capacity to accept an edge of opposite type as the stuck edge and is connected to S1 with an edge of the same type as the stuck edge, the indirect stuck resolution method of FIGS. 6a,b can be applied. FIG. 8f shows modification of the expansion to reflect this particular resolution.

In either case, the modified expansion is then used to modify the storage group definitions 601 and server allocation definitions 602. With respect to the direct resolution of FIG. 8e, the modifications made to the storage group definitions 601 are: 1) hx connected to S1 with edge of same type as stuck edge (which is no longer stuck); 2) hx deleted from S2; 3) h1 connected to S2 with edge of same type as stuck edge); and, 4) h1 deleted from S1. Also, with respect to the direct resolution of FIG. 8e, the modifications made to the server allocation definitions 602 are: 1) h1 deletes edge to S1 and adds edge to S2 having same type as stuck edge; 2) h2 deletes edge to S2 and adds edge to S1 having same type as stuck edge.

The modifications to be made to the storage group definitions 601 and the server definitions 602 for the indirect resolution of FIG. 8f can be readily determined from FIG. 8f.

FIG. 9 shows an embodiment for the stuck resolution method 403 described just above. As observed in FIG. 9, the method includes constructing an expansion of the stuck storage group out to the fifth level 901 and then searching for the conditions that permit the direct and indirect resolution methods to be applied 902.

A general principle of the direct and indirect stuck edge resolution algorithms is that another server (hx) that is not already connected by an edge to the stuck storage group (S1) is used to help resolve the stuck condition. In an embodiment, the process for identifying hx first attempts to find hx in a storage group that does not have any edges with the stuck storage group S1.

In order to achieve this objective, as explained just above, an expansion 901 from the stuck storage group S1 is carried out to the fifth level to identify the other server hx at the fourth level and the other storage group (S2) at the fifth level. As storage group at the fifth level is guaranteed not to have an edge with one of S1's servers because all such servers are at the third level. Thus, if the conditions for one of the direct or indirect stuck resolution algorithms is met with a storage group S2 at the fifth level 902, the applicable algorithm is applied to remove the stuck condition 910.

If, however, no such storage group is found at the fifth level, storage groups that are not included in the expansion are next considered 903. That is, storage groups that are beyond the fifth level are searched 903. Here, a server (hx) that belongs to a storage group beyond the fifth level is looked for such that the conditions for direct or indirect resolution are met 903.

This search 903 can be performed in various ways including, e.g., by randomly searching the storage group definition list 601 for storage groups that are not included in the third or fifth levels, and/or, searching the server allocations list 602 for servers that are not included in the second or fourth levels, and/or, by expanding the expansion to the sixth and seventh levels and studying the newly added storage groups at the seventh level, etc. Assuming a storage group S2 at the seventh level or beyond is found with the appropriate conditions for direct or indirect stuck resolution, the applicable stuck resolution method is applied 910.

If a storage group S2 beyond the fifth level that meets the conditions for direct and indirect resolution cannot be found, the third level of the expansion is searched for a storage group S2 having a server hx at the fourth level that together meet the conditions for direct or indirect resolution 904. If such a storage group is found, the stuck condition is resolved 910.

Here, it is worthwhile to point out, referring to FIG. 5a, that S2 can additionally be connected to h2 (not shown in FIG. 5a). As just another example, referring to FIG. 6a, s2 can additionally be connected to h1 (not shown in FIG. 6a). In either of these cases, S2 will be in the third level of the expansion, hx will be in the fourth level of the expansion, and both the direct and indirect stuck resolution methods can be respectively followed as depicted in FIGS. 5a,b and 6a,b. Said another way, the "additional" edges of S2 that also connect to S1's servers do not interfere with these resolution methods nor offend the storage group definition requirements (both S1 and S2 have only one edge to each of their respective n servers, its just that there is some overlap between their respective sets of n servers).

If a storage group S2 cannot be found at the third level with server hx at the fourth level that meet the conditions for direct or indirect resolution, the expansion is analyzed for a storage group S2 at the third level and a server hx at the fourth level that meet the conditions for another, "back-up", resolution method 905. In various embodiments, the back-up resolution method is more complicated than the direct or indirect resolution methods because movements/reconnections are applied to both of a pair of edges that connect to the same server but different storage groups S1, S2.

FIGS. 10a and 10b depict such a method. As observed in FIG. 10a, S1 desires to create a D edge 1001 (the stuck edge) but a server cannot be found that S1 is not already connected to that can take on another D edge. A first of S1's committed servers, h1, connects to S1 with a D edge and has the capacity to take on another D edge. A second of S1's committed servers, h2, connects to S1 with an E edge 1003. Server h2 does not have any capacity to take on any more edges.

A level three storage group S2 also connects to h2 but with a D edge 1002. S2 also connects to hx with an E edge 1002. The resolution algorithm, as observed in FIG. 10b, disconnects edge 1003 from h2 and disconnects edge 1002 from hx. Edge 1003 is then reconnected to hx and edge 1002 is reconnected to h2. This movement exerts no change to h2's or hx's E capacity status (they both lose an E edge and have it replaced with an E edge).

In terms of meeting the requirement that a server is allowed to have only one edge connection to a particular storage group, the re-assignment of edge 1003 to hx frees up h2 to take on edge 1001. However, edge 1003 is an E edge and edge 1001 is a D edge. Because h2 does not have the capacity to take on another D edge, h2 is still not in a position to accept edge 1001.

In order to resolve this problem, edge 1004 is moved from h2 to h1 (h1 has the capacity to accept another D edge). With D edge 1004 removed from h2, h2 can take on another D edge. As such, edge 1001 is connected to h2 and the stuck state is resolved.

The above described process can also be performed where the types of all mentioned edges are flipped (D to E, and, E to D).

FIG. 11 shows an improved object storage system 1100 that resolves graphs made of storage groups to resolve a situation where a server cannot be found having capacity to handle a particular chunk of an erasure coded object to be stored in the system. Here, the improved object storage system includes associated software, hardware or combination thereof 1103 configured to construct graphs of objects that are to be stored in the system and store constructed graphs of objects stored in the system consistent with the teachings above. The hardware and/or software 1103 processes the graphs, consistent with the teachings above, to resolve the aforementioned situation. Although the software, hardware or combination thereof 1103 is depicted in FIG. 11 as being wholly centralized, such software, hardware or combination thereof 1103 can also be partially or wholly distributed. In the case of the former (centralized), loosely speaking, the software, hardware or combination therefore 1103 is largely integrated at a single point or location of the system. By contrast, in the case of the later (partially or wholly distributed), loosely speaking, separate instances of the software, hardware or combination therefore 1103 are dispersed across different points or locations of the system.

The servers 1101 have the storage resources can each be implemented as a computing system or computer. In an embodiment, objects can be presented to a subset of the servers or any of the servers 1101 for storage (if an object is not stored on the local system it is presented to, it is sent over the network to the appropriate server). Such servers 1101 can be configured with their own instance of graph construction and resolution program code that executes the graph construction and resolution methods described above to apply the graph construction and resolution methods to the objects they receive for storage. These instances of program code can access the list of storage groups 601 and list of server allocations 602 via the network 1102 if they have no local instances of these repositories. The lists 601, 602 can be stored in a centralized or distributed fashion (within the servers 1101). In the case of the later, multiple copies of the lists can be instantiated within the system and are regularly synchronized to maintain consistency.

The resolution software, hardware or combination thereof 1103 can also invoke movement of chunks over the network to different servers to physical effect the obtained resolution.

FIG. 12 provides an exemplary depiction of a computing system 1200 or computer such as any of the servers 1101 and/or any one or more computers used to implement the graph construction and/or graph resolution methods discussed just above.

As observed in FIG. 12, the basic computing system/computer 1200 cab include a central processing unit (CPU) 1201 (which may include, e.g., a plurality of general purpose processing cores 1215_1 through 1215_X) and a main memory controller 1217 disposed on a multi-core processor or applications processor, main memory 1202 (also referred to as "system memory"), a local wired point-to-point link (e.g., universal serial bus (USB)) interface 1204, a peripheral control hub (PCH) 1218; various network I/O functions 1205 (such as an Ethernet interface and/or cellular modem subsystem), a wireless local area network (e.g., WiFi) interface 1206, a wireless point-to-point link (e.g., Bluetooth) interface 1207 and a Global Positioning System interface 1208, various sensors 1209_1 through 1209_Y, a battery 1211, a power management control unit 1212, a speaker and microphone 1213 and an audio coder/decoder 1214.

An applications processor or multi-core processor 1250 may include one or more general purpose processing cores 1215 within its CPU 1201, one or more graphical processing units 1216, a main memory controller 1217 and a peripheral control hub (PCH) 1218 (also referred to as I/O controller and the like). The general purpose processing cores 1215 typically execute the operating system and application software of the computing system. The graphics processing unit 1216 typically executes graphics intensive functions to, e.g., generate graphics information that is presented on a display. The main memory controller 1217 interfaces with the main memory 1202 to write/read data to/from main memory 1202. The power management control unit 1212 generally controls the power consumption of the system 1200. The peripheral control hub 1218 manages communications between the computer's processors and memory and the I/O (peripheral) devices.

Each of the communication interfaces 1204-1207, the GPS interface 1208, the sensors 1209, and the speaker/microphone codec 1213, 1214 all can be viewed as various forms of I/O (input and/or output) relative to the overall computing system including, where appropriate, an integrated peripheral device as well. Depending on implementation, various ones of these I/O components may be integrated on the applications processor/multi-core processor 1250 or may be located off the die or outside the package of the applications processor/multi-core processor 1250. The computing system also includes non-volatile mass storage 1220 which may be the mass storage component of the system. The non-volatile mass storage 1220 may be implemented with one or more solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard interconnected logic circuitry (e.g., application specific integrated circuit (ASIC) logic circuitry) or programmable logic circuitry (e.g., field programmable gate array (FPGA) logic circuitry, programmable logic device (PLD) logic circuitry)

for performing the processes, or by any combination of program code and logic circuitry.

Elements of the present invention may also be provided as a machine-readable storage medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions. The program code is to be executed by one or more computers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
performing the following as part of a process for storing an object into an object storage system:
assigning chunks of the object to different servers of the object storage system and constructing a graph for the object that describes which of the chunks of the object are being stored in which of the servers;
recognizing a stuck condition in which a server with available storage space to store one of the chunks of the object cannot be found;
in response to the recognizing, expanding the graph with information from graphs of other objects that are stored in the object storage system to identify other servers in the object storage system to help resolve the stuck condition;
processing the expanded graph information to recognize looked for graphical conditions;
applying a solution for the looked for graphical conditions to the expanded graph information to resolve the stuck condition including modifying at least some of the information from the graphs of the other objects; and,
moving chunks of one of the other objects affected by the modifying over a network to a new server within the object storage system.

2. The method of claim 1 wherein the graph comprises a storage group vertex that represents the object's storage group, the storage group vertex connected by edges to server vertexes that represent the servers, and, the information from the graphs of other objects comprises respective storage group vertexes connected by additional edges to respective server vertexes that represent the respective servers that the other objects are stored upon.

3. The method of claim 2 wherein the applying of the solution further includes dis-connecting one of the additional edges from one of the respective server vertexes and connecting it to one of the server vertexes.

4. The method of claim 3 wherein the applying of the solution further includes connecting an edge that represents the stuck condition to the one of the respective server vertexes.

5. The method of claim 4 wherein the one of the additional edges and the edge that represents the stuck condition are of a same type being one of data or erasure.

6. The method of claim 2 wherein the applying of the solution further includes:

dis-connecting one of the edges from one of the server vertexes and connecting it to one of the respective server vertexes; and,
connecting an edge that represents the stuck condition to the one of the server vertexes.

7. The method of claim 1 wherein the processing and applying further comprises:
failing to find a solution at a fifth level of the expansion; and,
in response to the failing, recognizing a looked for condition having a server that stores chunks in one of the servers.

8. The method of claim 7 wherein the applying of the solution further includes assigning the chunks in one of the servers to another one of the servers.

9. A non-transitory machine readable storage medium storing program code, the program code to perform a method when executed by one or more computers, the method comprising:
performing the following as part of a process for storing an object into an object storage system:
assigning chunks of the object to different servers of the object storage system and constructing a graph for the object that describes which of the chunks of the object are being stored in which of the servers;
recognizing a stuck condition in which a server with available storage space to store one of the chunks of the object cannot be found;
in response to the recognizing, expanding the graph with information from graphs of other objects that are stored in the object storage system to identify other servers in the object storage system to help resolve the stuck condition;
processing the expanded graph information to recognize looked for graphical conditions;
applying a solution for the looked for graphical conditions to the expanded graph information to resolve the stuck condition including modifying at least some of the information from the graphs of the other objects; and,
moving chunks of one of the other objects affected by the modifying over a network to a new server within the object storage system.

10. The storage medium of claim 9 wherein the graph comprises a storage group vertex that represents the object's storage group, the storage group vertex connected by edges to server vertexes that represent the servers, and, the information from the graphs of other objects comprises respective storage group vertexes connected by additional edges to respective server vertexes that represent the respective servers that the other objects are stored upon.

11. The storage medium of claim 10 wherein the applying of the solution further includes dis-connecting one of the additional edges from one of the respective server vertexes and connecting it to one of the server vertexes.

12. The storage medium of claim 11 wherein the applying of the solution further includes connecting an edge that represents the stuck condition to the one of the respective server vertexes.

13. The storage medium of claim 12 wherein the one of the additional edges and the edge that represents the stuck condition are of a same type being one of data or erasure.

14. The storage medium of claim 10 wherein the applying of the solution further includes:
dis-connecting one of the edges from one of the server vertexes and connecting it to one of the respective server vertexes; and, connecting an edge that represents the stuck condition to the one of the server vertexes.

15. The storage medium of claim 9 wherein the processing and applying further comprises:
    failing to find a solution at a fifth level of the expansion; and,
    in response to the failing, recognizing a looked for condition having a server that stores chunks in one of the servers.

16. The storage medium of claim 15 wherein the applying of the solution further includes assigning the chunks in one of the servers to another one of the servers.

17. A computing system, comprising:
    one or more processors;
    a non-transitory machine readable storage medium storing program code, the program code to perform a method when executed by the one or more processors, the method comprising:
    performing the following as part of a process for storing an object into an object storage system:
    assigning chunks of the object to different servers of the object storage system and constructing a graph for the object that describes which of the chunks of the object are being stored in which of the servers;
    recognizing a stuck condition in which a server with available storage space to store one of the chunks of the object cannot be found;
    in response to the recognizing, expanding the graph with information from graphs of other objects that are stored in the object storage system to identify other servers in the object storage system to help resolve the stuck condition;
    processing the expanded graph information to recognize looked for graphical conditions;
    applying a solution for the looked for graphical conditions to the expanded graph information to resolve the stuck condition including modifying at least some of the information from the graphs of the other objects; and,
    moving chunks of one of the other objects affected by the modifying over a network to a new server within the object storage system.

18. The computing system of claim 17 wherein the graph comprises a storage group vertex that represents the object's storage group, the storage group vertex connected by edges to server vertexes that represent the servers, and, the information from the graphs of other objects comprises respective storage group vertexes connected by additional edges to respective server vertexes that represent the respective servers that the other objects are stored upon.

19. The computing system of claim 18 wherein the applying of the solution further includes dis-connecting one of the additional edges from one of the respective server vertexes and connecting it to one of the server vertexes.

20. The computing system of claim 19 wherein the applying of the solution further includes connecting an edge that represents the stuck condition to the one of the respective server vertexes.

* * * * *